United States Patent [19]
Miermans

[11] Patent Number: 6,157,179
[45] Date of Patent: Dec. 5, 2000

[54] SWITCHED-MODE POWER SUPPLY FOR CHARGING A CAPACITANCE DURING A FIRST PERIOD, FORMING A RESONANT CIRCUIT WITH AN INDUCTANCE, AND DISCHARGING THE CAPACITANCE INTO A LOAD DURING A SECOND PERIOD DISJUNCT FROM THE FIRST PERIOD

[75] Inventor: Hubertus C. Miermans, Eindhoven, Netherlands

[73] Assignee: U.S. Philips Corporation, New York, N.Y.

[21] Appl. No.: 09/093,600

[22] Filed: Jun. 9, 1998

[30] Foreign Application Priority Data

Jun. 13, 1997 [EP] European Pat. Off. ............. 97201787

[51] Int. Cl.⁷ ...................................................... G05F 1/56
[52] U.S. Cl. ............................................................ 323/282
[58] Field of Search ..................................... 323/282, 285, 323/351; 363/125, 78, 81, 84

[56] References Cited

U.S. PATENT DOCUMENTS

| | | | |
|---|---|---|---|
| 3,596,165 | 7/1971 | Andrews | 321/2 |
| 4,454,558 | 6/1984 | Huddart | 361/153 |
| 4,692,851 | 9/1987 | Attwood | 363/16 |
| 4,821,166 | 4/1989 | Albach | 363/89 |
| 5,831,839 | 11/1998 | Pansier | 363/21 |

FOREIGN PATENT DOCUMENTS

| | | | |
|---|---|---|---|
| 322780 | 2/1984 | Germany | H02P 13/22 |
| 2060220 | 4/1981 | United Kingdom | G05F 1/46 |

*Primary Examiner*—Adolf Deneke Berhane
*Attorney, Agent, or Firm*—Edward W. Goodman

[57] ABSTRACT

A switched-mode power supply specially suitable for supplying a low output power. The switched-mode power supply periodically first charges a capacitor (C) from an input voltage (Vin) during a first period of time (T1), and then forms a resonant circuit, including the capacitor (C) and an inductor (L), to transfer the charge in the capacitor (C) to a load (Z) via a rectifier during a second period of time (T2).

7 Claims, 6 Drawing Sheets

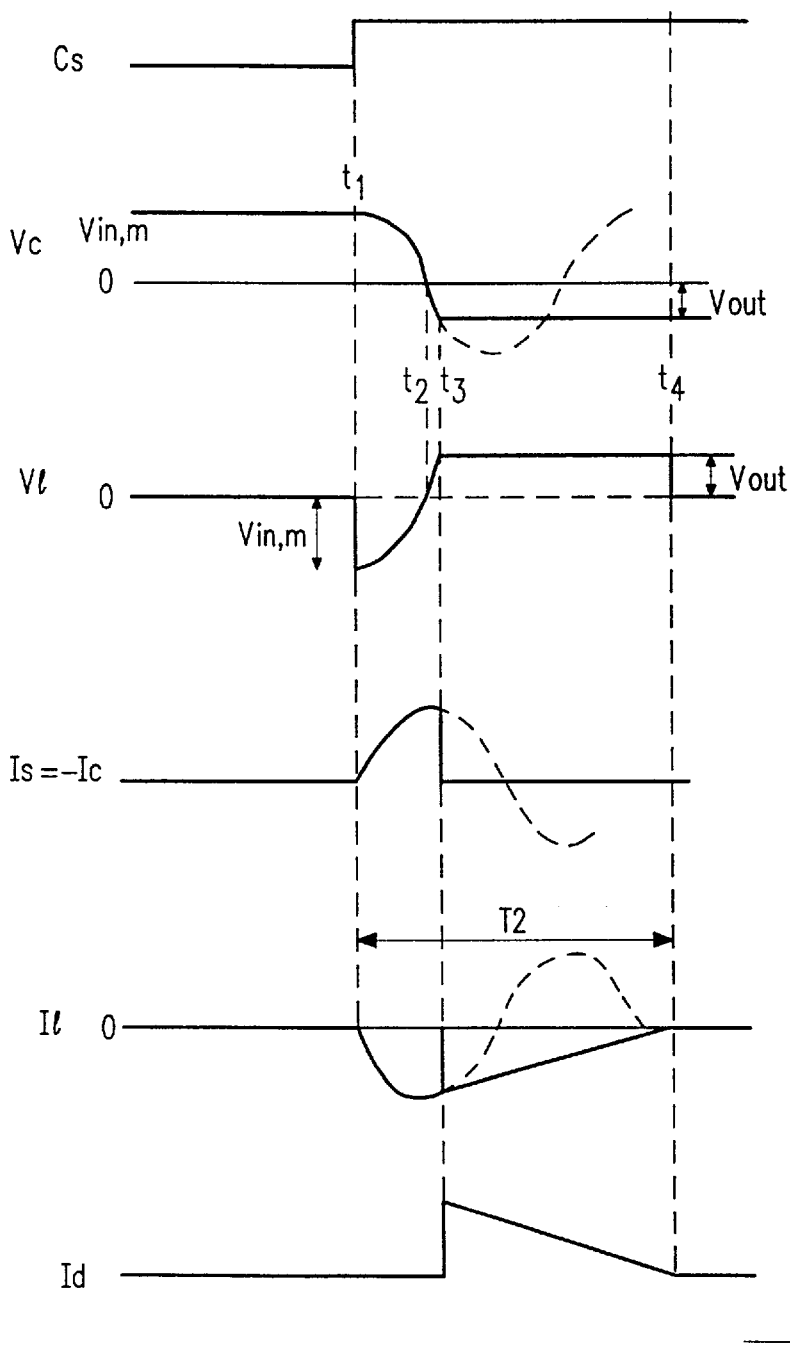

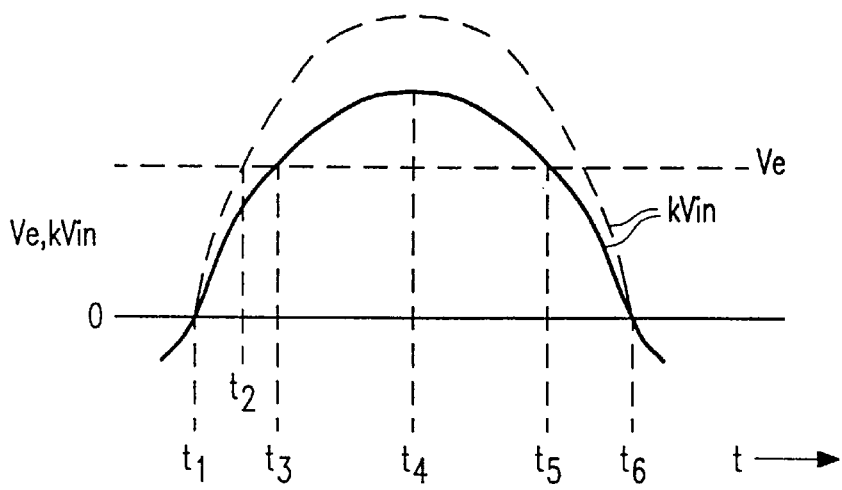
FIG. 9A
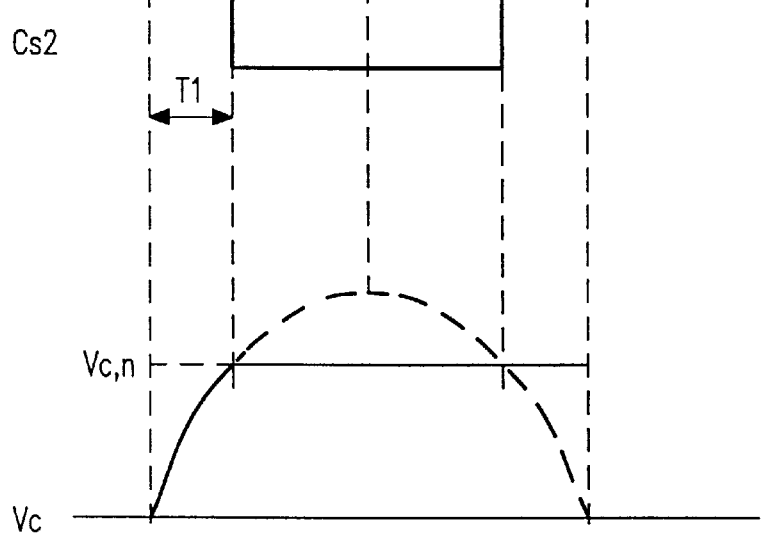
FIG. 9B
FIG. 9C

SWITCHED-MODE POWER SUPPLY FOR CHARGING A CAPACITANCE DURING A FIRST PERIOD, FORMING A RESONANT CIRCUIT WITH AN INDUCTANCE, AND DISCHARGING THE CAPACITANCE INTO A LOAD DURING A SECOND PERIOD DISJUNCT FROM THE FIRST PERIOD

BACKGROUND OF THE INVENTION

1. Field of the Invention

The invention relates to a switched-mode power supply comprising input terminals for receiving an input voltage and output terminals for supplying a DC output voltage to a load; a capacitance and an inductance; charging means for receiving the input voltage, coupled to the capacitance for periodically storing a charge in the capacitance during a first period; rectifier means coupled between the inductance and one of the output terminals to supply the DC output voltage; a switching element coupled to the inductance; and a control circuit for controlling the switching element in an on or off-state, in which the switching element is periodically in the on-state during a second period. The invention also relates to a display apparatus comprising such a switched-mode power supply.

Such a switched-mode power supply is especially suitable for supplying a standby power in apparatuses in which parts of the circuits have to be active in a standby mode.

2. Description of the Related Art

In a known non-switched-mode power supply, a transformer is used which has a primary winding connected to the AC line. A secondary winding supplies a low voltage which, after stabilization, is suitable for supplying a low power to circuits in a television receiver which have to be active in the standby mode. Such a transformer, which is suitable for transforming the high line voltage to a low standby voltage at the low line frequency, is bulky. Such a non-switched-mode power supply has a very low efficiency due to stabilization losses which are extremely high if the line voltage varies over a large range. An additional main switched-mode power supply is available to supply a large power during normal operating conditions of the receiver. This main switched-mode power supply may be of any known type. All these main switched-mode supplies have in common that energy from the line is transferred to the load via a magnetic field in an inductor. To avoid bulky inductors, a high switching frequency of the main switched-mode power supply has to be selected.

It is also known that the main switched-mode power supply is used for generating the low standby power. Such a main switched-mode power supply, which is designed to supply a high output power, operates with a low efficiency if the low output power is supplied. For a large part, this is caused by the switching losses in the components and no-load losses in the system. At a low load, these no-load losses are relatively high. These switching losses depend heavily on the switching frequency. Therefore, solutions to improve the efficiency have been found by lowering the switching frequency of the main switched-mode power supply in the standby mode. However, the switching frequency has to be selected above the highest audible frequency to avoid irritation of the users by the noise generated by the switched-mode power supply. On the other hand, a very low switching frequency results in very large inductors and is not a viable alternative.

It is also known that a separate switched-mode power supply is used for supplying a small standby power in a television apparatus. Such a separate switched-mode power supply can be optimized for supplying a low power at a high efficiency. However, for the same reasons as given above, the switching frequency has to be selected above the highest audible frequency to avoid audible noise or too large inductive components. Although these separate optimized switched-mode power supplies yield a better efficiency in supplying a low power than the main switched-mode power supplies, the efficiency can still be improved. The separate switched-mode power supply is often a flyback converter. Such a flyback converter comprises input terminals to receive an AC line voltage. A series arrangement of a rectifier circuit and a smoothing capacitor is arranged across the input terminals to receive the AC line voltage. A series arrangement of an inductor and a main current path of a transistor is connected across the smoothing capacitor. Energy is stored in the inductor during an on-time of the transistor. The energy in the inductor is transferred to a load via a rectifier diode during the off-time of the transistor. A control circuit controls the switching transistor to switch at a frequency which is selected high enough to avoid audible noise. In most cases, dissipative snubber circuits are arranged in parallel with the inductor to avoid too steep variations of voltages or too high voltages in the circuit. The high switching frequency and the dissipative snubber cause the known separate switched-mode power supplies to have a non-optimal efficiency.

SUMMARY OF THE INVENTION

It is an object of the invention to provide a switched-mode power supply having an improved efficiency.

To this end, a first aspect of the invention provides a switched-mode power supply as described in the opening paragraph, characterized in that the capacitance, the inductance and the switching element are arranged to form a resonant circuit in the on-state of the switching element for transferring charge stored in the capacitance to the load via said rectifier means, wherein said first and second periods are disjunct, and whereby transfer of energy from the input terminals to the output terminals is substantially determined by the charge stored in the capacitance. A second aspect of the invention provides a display apparatus comprising a display device for displaying incoming display information; a signal-processing circuit for processing the incoming display information to obtain a display signal suitable to drive the display device; a command circuit for receiving user commands and for adjusting the processing performed by the signal-processing circuit; and a main power supply for supplying power to at least part of the signal processing circuit, the display apparatus comprising such a switched-mode power supply.

In a first period of time, a capacitance is charged via a charging circuit which receives an input voltage. The input voltage may be a DC voltage, a single phase or double phase rectified AC line voltage, or an AC-voltage having a non-sinusoidal shape. The rectified AC line voltage need not be smoothed. In case the input voltage is a DC voltage, a separate oscillator may be used which controls a controllable switching element in the charging circuit to couple the DC input voltage to the capacitance during the first period in time. In the case of a rectified AC line (or AC–) input voltage, the charging circuit may comprise the controllable switching element controlled by the separate oscillator. Alternatively, the charging circuit may comprise a single or double phase rectifier circuit coupled between the input voltage and the capacitance. In the latter situation, the capacitance will be charged during a first period of time in which a polarity and amplitude of the AC line voltage cause the rectifier circuit to be conductive. In this way, it is possible to store a charge in the capacitance at low losses. It is possible to freely select the repetition frequency of the charging period because, in contrast to an inductance, the capacitance does not produce audible noise. It is even possible to use the repetition frequency of the rectified AC line input voltage to charge the capacitance without the need for a bulky inductor to prevent a very large current in the inductor.

After the first period of time, during which the capacitance has been charged, the capacitance has to be discharged completely or partly into the load. To this end., a switching element is arranged to form a series or parallel resonant circuit including the capacitance and the inductance. In this way, the low-power switched-mode power supply, according to the invention, transfers charge in the capacitance resonant to the load, with low losses. As the circuit operates resonantly, a dissipative snubber, for avoiding steep signal transitions, is not needed. The resonance frequency can be selected independently of the repetition frequency of the charging operation of the capacitor. Consequently, it is possible to select a high resonance frequency thereby obtaining a small inductance. For the transfer of the charge in the capacitor to the load, it may suffice if the actual transfer of charge is limited to half or less of a resonance period. In a preferred embodiment of the invention, the capacitance is charged with a repetition frequency of a rectified line voltage, and the capacitance is discharged with a much higher resonance frequency (above the highest audible frequency).

In an embodiment of the invention characterized in that the input voltage is an AC line voltage, the charging means comprises a single phase or double phase rectifier circuit for supplying current to the capacitance during the first period, and the control circuit is adapted to receive the AC line voltage for determining the second period in response to the AC line voltage, a rectified line voltage is used to charge the capacitance during the first period of time. This has the advantage that the voltage difference between the AC line input voltage and the voltage across the capacitance is very low at the moment the rectifier circuit becomes conductive and thus large currents are prevented. Even if an inductor is arranged in series with the capacitance during the charging phase, the small current will thus not cause audible noise.

Furthermore, the single phase rectifier circuit only supplies current to the capacitance if the AC line voltage has a polarity corresponding to the polarity of the voltage occurring across the capacitance and a value higher than the voltage across the capacitor. The double phase rectifier may charge the capacitance independent of the polarity of the AC line voltage as long as the AC line voltage is larger than the voltage on the capacitance. The capacitance will not be discharged during the charging period, which is the first period, as the second period and the first period are disjunct. In normal operating conditions, the first period will certainly end when the AC line voltage reaches its maximum amplitude. The control circuit is thus able to determine the second period of time by using the AC line voltage as input information. Consequently, a simple control circuit can be used because the switching element is controlled by using the line voltage instead of a separate oscillator signal.

In an embodiment of the invention characterized in that the charging means comprises a single phase rectifier circuit for supplying the current to the capacitance during at least part of a first polarity of the AC line voltage, and the control circuit comprises a voltage-detecting means for detecting the other polarity of the AC line voltage to generate a control signal which is active during at least part of a period in which the AC line voltage has the other polarity, the active control signal determining the second period, the capacitance is charged via a single phase rectifier circuit. In this way, current is supplied to the capacitance during part of half a period of the AC line voltage in which the AC line voltage has a first polarity. During the next half period, the AC line voltage has a second polarity opposite to the first polarity and the rectifier circuit is non-conductive. The control circuit generates the second period of time, based on detecting the second polarity of the AC line voltage. Such a detection is very simple.

In an embodiment of the invention characterized in that the switching element is a thyristor having a main current path arranged to form the resonant circuit with the inductance and the capacitance if the thyristor is conductive, and a control input coupled to receive the control signal of the voltage-detecting means for bringing the thyristor in a conductive state during the second period, the switching element is a thyristor. The thyristor has several advantages in this circuit. As energy is transferred only at a repetition frequency which is equal to the low line frequency, the peak current in the resonance circuit during the high resonant frequency will be high but the energy dissipated in the thyristor will be very small. Consequently, it is possible to use a small and cheap thyristor (for example, in a TO92 or SMD package). A second advantage is the low trigger current (for example, 20 $\mu$A) needed by the thyristor.

In an embodiment of the invention characterized in that a series arrangement of the capacitance and the inductance is coupled to the input terminals via the charging means, the rectifier means is coupled between a terminal of the inductance and said one of the output terminals, and the switching element is coupled across the series arrangement of the capacitance and the inductance, the switching element has a main terminal coupled to one of the input terminals, and can thus be controlled to switch on and off with a simple circuit.

In an embodiment of the invention characterized in that a parallel stabilizer is coupled between the output terminals, a parallel stabilizer (for example, a zener diode) is coupled between the output terminals to stabilize the output voltage supplied to the load. The amount of energy which can be transferred to the load is limited by the amount of charge stored in the capacitance. This amount of charge can be selected in such a way that just a little bit more than the maximal power needed by the load can be supplied. In this way, stabilization is obtained with simple means and without excessive dissipation.

In an embodiment of the invention characterized in that the charging means comprises a controllable switching element arranged between at least one of the input terminals and the capacitance, and the control circuit is adapted to supply a further control signal to the controllable switching element for controlling the controllable switching element in a state enabling charging of the capacitance during the first period of time and to disconnect the capacitance from said at least one input terminal outside the first period, the first period of time is determined by the time the controllable switching element enables the capacitance to be charged. In this way, it is possible to control of the amount of charge stored in the capacitance by varying the first period in time.

In an embodiment of the invention characterized in that the control circuit comprises comparison means for comparing the input voltage or the output voltage or a voltage across the capacitance with a reference signal to control the first period in order to decrease the influence of a variation of the input voltage or the load, the charge stored in the capacitor is controlled to compensate for variations of the input voltage or load.

These and other aspects of the invention are apparent from and will be elucidated with reference to the accompanying drawings.

BRIEF DESCRIPTION OF THE DRAWINGS

In the drawings:

FIGS. 5A to 5F show waveforms to explain the operation of the circuit diagram of FIG. 3 with respect to the resonance frequency;

FIG. 9A to 9C show waveforms of signals occurring in the circuit as shown in FIG. 8.

DESCRIPTION OF THE PREFERRED EMBODIMENTS

Figure 1:
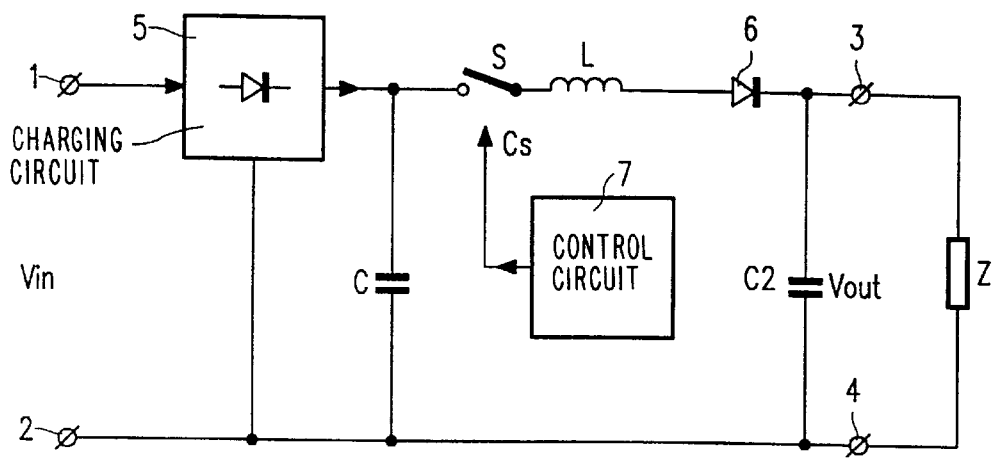
FIG. 1 shows a basic circuit diagram of a switched-mode power supply according to the invention.
Figure 6:
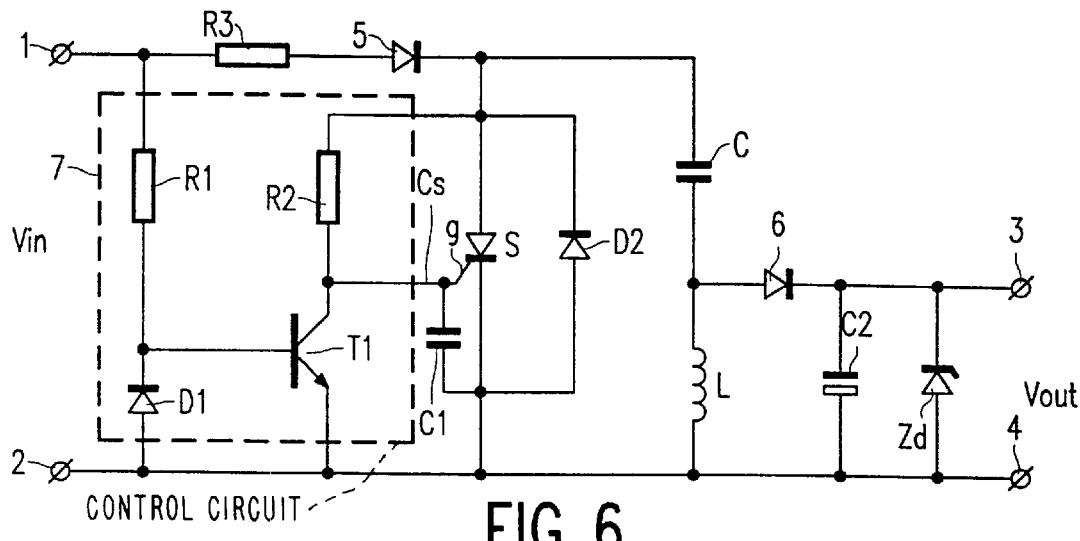
FIG. 6 shows a detailed circuit diagram of the preferred embodiment of the switched-mode power supply according the invention.

FIG. 1 shows a basic circuit diagram of a switched-mode power supply according to the invention. The switched-mode power supply circuit comprises input terminals 1,2 to receive an input voltage Vin and output terminals 3,4 to supply a DC output voltage Vout to a load Z. A charging circuit 5 is coupled to the input terminals 1,2 to receive the input voltage Vin. An output of the charging circuit 5 is connected to a capacitor C for periodically storing a charge in the capacitor C during a first period T1. A series arrangement of an inductor L, a switching element S, a rectifier 6 and-the load Z is coupled across the capacitor C. The rectifier 6 is shown as a diode, but any other element suitable for rectifying may be used (for example, a thyristor). A smoothing capacitor C2 is arranged between the output terminals 3,4. A control circuit 7 supplies a control signal Cs to a control input of the switching element S for controlling on and off-states of the switching element S. The switching element S is periodically in the on-state during a second period T2. The operation of the switched-mode power supply according to FIG. 1 is elucidated on the basis of an AC-input voltage Vin which, for example, is a line voltage. The charging circuit 5 may comprise a known single phase or double phase rectifier circuit to supply a rectified line voltage to the capacitor C. Thus, the capacitor C is charged during the first period T1 in which the AC-input voltage has a value which is higher than the voltage across the capacitor C. After this charging period, the switching element S is closed during the second period T2. Now, the capacitor C and the inductor L form a resonant circuit, and energy in the capacitor C is transferred to the load Z via the rectifier 6. The control circuit 7 may determine the second period T2 based on the AC-input voltage Vin; a detailed embodiment of such a control circuit 7 is shown in FIG. 6. The control circuit 7 may also sense the voltage Vc on the capacitor C to start the second period T2 with a certain delay after a maximum value of the input voltage Vin has been reached. The transfer of energy from the input terminals 1,2 to the output terminals 3,4 is substantially determined by the charge stored in the capacitance C. The first period T1 and second period T2 have to be disjunct to allow energy to be stored substantially in the capacitor C during the first period T1, and to obtain a resonant circuit L,C which is able to transfer energy stored in the capacitor C to the load Z during the second period T2.

Figure 2:
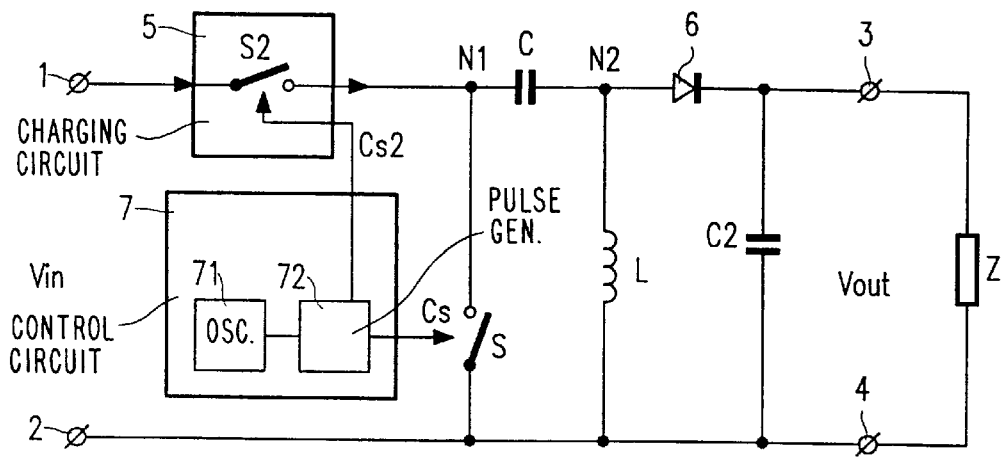
FIG. 2 shows a basic circuit diagram of a switched-mode power supply according to the invention, in which the input voltage is a DC voltage.

FIG. 2 shows a basic circuit diagram of a switched-mode power supply according to the invention. Elements which have the same reference numeral as in FIG. 1 have the same function. FIG. 2 shows an embodiment of the switched-mode power supply, in which the input voltage Vin is a DC voltage. In FIG. 2, the inductor L is arranged in series with the capacitor C during the first period T1. The inductor L has a low impedance at the (not too high) repetition frequency of the charging cycle of the capacitor C and the charging current of the capacitor C is very low at the end of the charging cycle. Therefore, the current flowing in the inductor L, and thus the magnetic energy stored in the inductor L, will be very low at the end of the charging cycle (T1). The charging circuit 5 now comprises a controllable switch S2 which is arranged between the input terminal 1 and a node N1. The capacitor C is arranged between the node N1 and a node N2. The rectifier 6 is arranged between the node N2 and output terminal 3. The switching element S is arranged between the node N1 and the input terminal 2. The inductor L is arranged between the node N2 and the input terminal 2. The capacitor C is charged during the on-time of the controllable switch S2. The control circuit 7 now comprises an oscillator 71 for generating a repetitive oscillator signal which is supplied to a pulse generator 72. The pulse generator 72 supplies a control signal Cs2 to the controllable switch S2 and the control signal Cs to the switching element S. The pulse generator 72 may comprise resettable counters, and may operate as described. A first counter generates the first period of time T1 by counting a first predetermined number of cycles of the oscillator signal from a start moment. The control signal Cs2 closes the controllable switch S2 at the start moment and opens the controllable switch S2 at the moment the first predetermined number is reached. A second counter starts counting a second predetermined number of cycles of the oscillator signal triggered by the moment the first counter reaches the first predetermined number. The second period T2 runs from the start moment of the second counter until the moment the second predetermined number is reached. The switching element S is closed during the second period T2. The start moment of the first counter is determined by the moment the second counter reaches the second predetermined number. The pulse generator 72 can be configured in many different ways, and it is possible to select the first and second periods T1,T2 in such a way that a period occurs during which both the switching element S and the controllable switch S2 are open.

Figure 3:
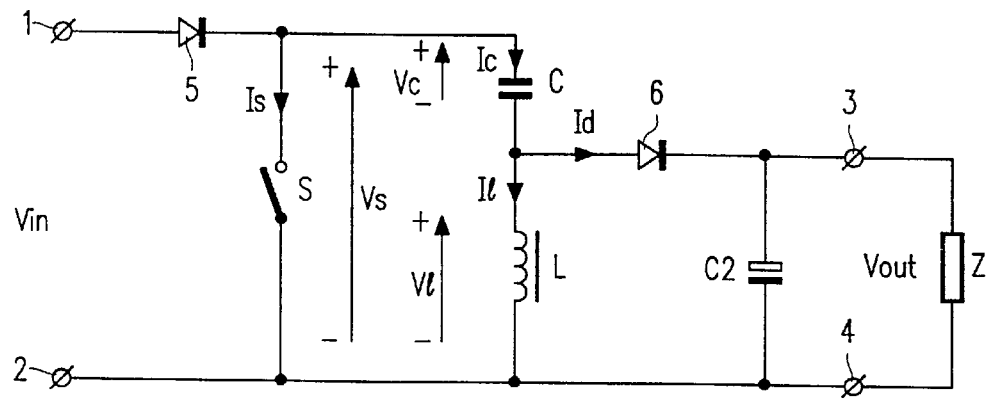
FIG. 3 shows a basic circuit diagram of a preferred embodiment of the switched-mode power supply according to the invention.

FIG. 3 shows a basic circuit diagram of a preferred embodiment of the switched-mode power supply according to the invention. Elements which have the same reference numeral as in FIG. 1 have the same function. Now, the input voltage Vin is an AC line voltage. A series arrangement of the charging circuit 5, which is a rectifier diode, the capacitor C and the inductor L is arranged across the input terminals 1,2. The switching element S is arranged across the series arrangement of the capacitor C and the inductor L. The rectifier 6 is arranged between the junction point of the capacitor C and the inductor L, on the one hand, and the output terminal 3, on the other hand. The capacitor C is charged via the rectifier diode 5 during the first period of time when the AC line voltage has a suitable polarity and amplitude. The switching element S is open during the first period of time. The voltage across the inductor L is small during the charging of the capacitor C, because the inductance of the inductor has been selected small. The rectifier diode 6 is non-conductive during the first period of time. After the first period of time T1, the switching element S is closed. The capacitor C and the inductor L form a parallel resonant circuit. The energy in the capacitor C is transferred to the inductor L. At the moment when all energy has been transferred to the inductor L, the voltage across the capacitor C is zero and the current in the inductor L is maximal. The current in the inductor L starts charging the capacitor C in an opposite polarity, the rectifier 6 starts conducting, and the energy in the inductor L is transferred to the load Z. The rectifier diode 5 is non-conductive outside the first period of time. The operation of the embodiment of the switched-mode power supply according to the invention as shown in FIG. 3 is elucidated in more detail with respect to the waveforms shown in FIGS. 4A to 4D and FIGS. 5A to 5F.

Figure 4A:
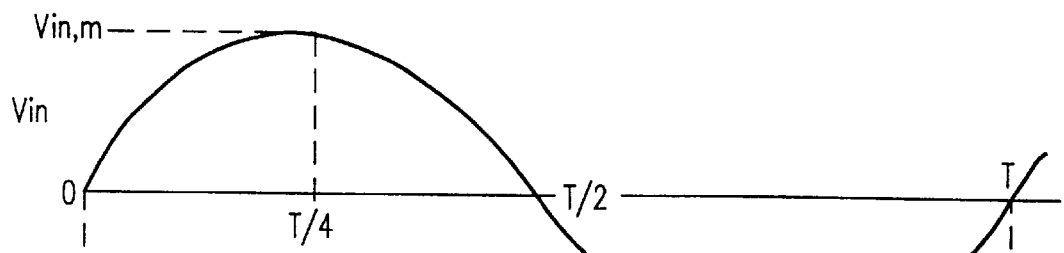
FIGS. 4A to 4D show waveforms to explain the operation of the circuit diagram of FIG. 3 with respect to the line frequency.
Figure 4B:
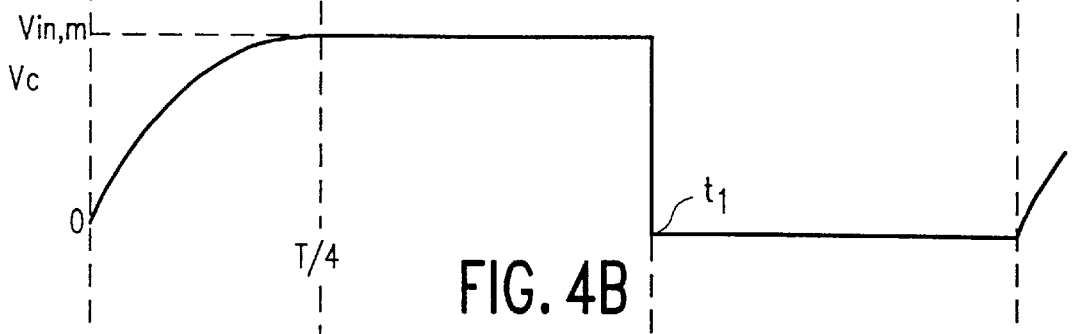
Figure 4C:
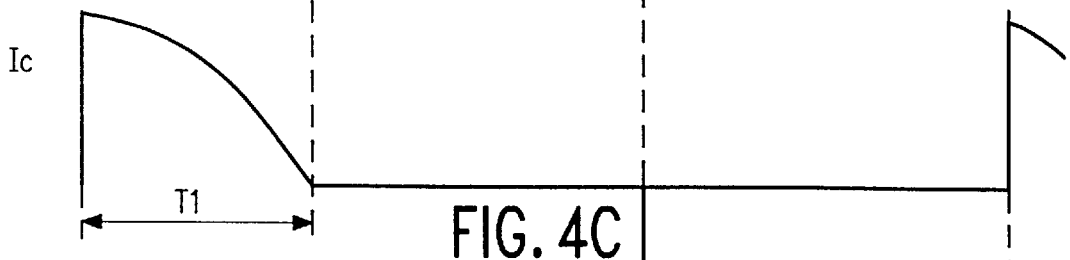
Figure 4D:
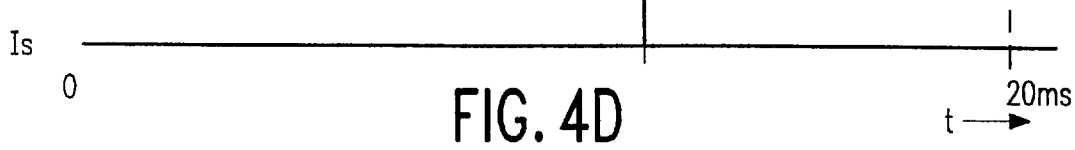

FIGS. 4A to 4D show the operation of the circuit diagram of FIG. 3 on a macro time scale related to the low AC line frequency. FIG. 4A shows the AC line input voltage Vin which has a line frequency of 50 or 60 Hz and a corresponding period duration T. The AC line input voltage Vin has a maximum value Vin,m which occurs during the positive polarity of the AC line input voltage Vin at instant T/4. FIG. 4B shows the voltage Vc across the capacitor C. The rectifier diode 5 starts conducting at moment 0 (assuming that the voltage across the capacitor C is zero and the rectifier diode 5 is ideal) and stops conducting at moment T/4. The voltage Vc across the capacitor C follows the AC line input voltage Vin, and the capacitor C will be charged to the peak value Vin,m of the AC line input voltage Vin at moment T/4. The capacitor C stores this peak voltage Vin,m until the moment t1 when the switching element S is closed. The charge in the capacitor C will be transferred to the load Z in a short period of time after t1 as the resonant circuit formed by the capacitor C and the inductor L has a high resonance frequency with respect 10 the line frequency. FIG. 4C shows the current Ic through the capacitor C. The charging of the capacitor C starts with a relatively high current. The charging current Ic becomes smaller as the voltage Vc across the capacitor C comes nearer the peak value Vin,m of the AC line voltage. FIG. 4D shows the current through the switching element S during the resonance phase. The period of time around t1 is shown many times enlarged in the FIGS. 5A to 5F.

FIGS. 5A to 5F show the operation of the circuit diagram of FIG. 3 on a time scale suitably to show the resonance behavior of the circuit during the transfer of the charge in the capacitor C to the load Z. FIG. 5A shows the control signal Cs which is supplied to the switching element S. The switching element S is closed at moment t1. FIG. 5B shows the voltage Vc across the capacitor C. FIG. 5C shows the voltage VL across the inductor L. FIG. 5D shows the currents Is and Ic through the switching element S and the capacitor C, respectively. FIG. 5E shows the current IL through the inductor L. FIG. 5F shows the current Id through the rectifier 6 flowing to the smoothing capacitor C2 and the load Z.

The voltage Vc on the capacitor C equals the peak value Vin,m of the AC line voltage Vin at moment t1 if the capacitor C is fully charged. The voltage Vl across the inductor L is zero just before the moment t1, and jumps to minus Vin,m at the moment t1 when the switching element S is closed. At the moment the switching element S is closed, the resonant circuit of the capacitor C and the inductor L start oscillating. The voltage Vc on the capacitor C decreases, the voltage Vl across the inductor L increases, the currents Is, Ic, and Il through the switching element S, the capacitor C and the inductor L, respectively, increase until the capacitor C is fully discharged at moment t2. Then, the current Il through the inductor L starts charging the capacitor C in the opposite polarity until the rectifier diode 6 starts conducting at moment t3. The voltages Vc and Vl across the capacitor C and the inductor L become equal to the DC output voltage Vout on the smoothing capacitor C2. The currents Ic and Is through the capacitor C and the switching element S, respectively, become zero. The currents Il and Id in the inductor L and through the rectifier diode D2, respectively, decrease until a zero value is reached at moment t4.

FIG. 6 shows a detailed circuit diagram of a preferred embodiment of the switched-mode power supply according to the invention as shown in FIG. 3. The switching element S is a thyristor with an anode connected to a cathode of the rectifier diode 5. The control circuit 7 comprises an npn transistor T1 with a collector connected to the gate of the thyristor S, an emitter connected to the input terminal 2, and a base connected to the input terminal 1 via a resistor R1. A diode D1 has a cathode connected to the base of the transistor T1 and an anode connected to the input terminal 2. The gate of the thyristor S is connected via a resistor R2 to the cathode of the rectifier diode 5, and via a capacitor C1 to the cathode of the thyristor S. The diode D1 is non conductive as long as the AC line input voltage Vin has a positive polarity (the voltage at the input terminal 1 is higher than at the input terminal 2). The transistor T1 is conductive and the thyristor S is non-conductive. The capacitor C is charged via the rectifier diode 5. The rectifier diode 5 stops conducting after the peak value Vin,m of the AC line input voltage Vin is reached. The diode D1 starts conducting after the polarity of the AC line input voltage Vin is changed. Consequently, the transistor T1 stops conducting and the thyristor S is triggered to become conductive. The resonant discharging of the capacitor C starts.

A zener diode Zd is arranged between the output terminals 3,4 to stabilize the output voltage Vout.

A special safety resistor R3 is arranged in series with the rectifier diode 5 to open the circuit in a safe way if the thyristor S becomes a permanent short circuit.

A diode D2 is arranged anti-parallel between the anode and the cathode of the thyristor S to suppress the negative voltage step across the thyristor S at switch-off. In this way, line interference caused by feedback of this negative pulse to the line is prevented.

The capacitor C1 delays the moment the thyristor S becomes conductive. Consequently, even if a short circuit is present between the output terminals 3,4, causing the rectifier diode 5 to be conductive until the polarity of the AC line voltage changes, the thyristor S and the rectifier diode 5 will not be conductive at the same time.

Practical values of the components used are: C=100 nF, L=100 μH, R1=R2=10 MΩ, R3=100 Ω, C1=220 nF.

Figure 7A:
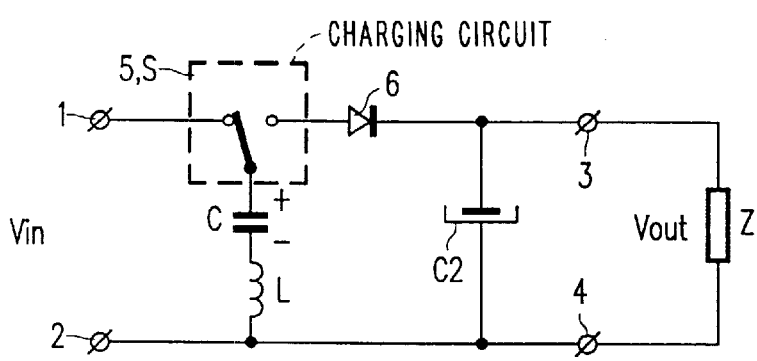
FIGS. 7A to 7C show basic circuit diagrams of alternative embodiments of the switched-mode power supply according to the invention.
Figure 7B:
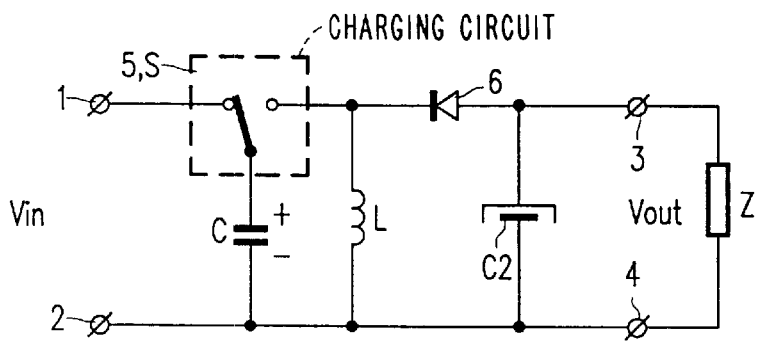
Figure 7C:
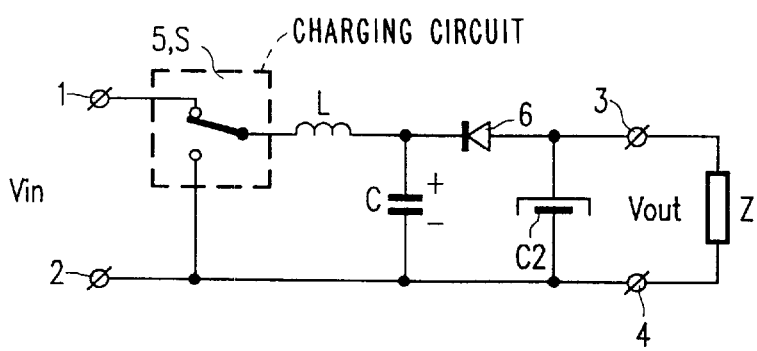

FIGS. 7A to 7C show basic circuit diagrams of alternative embodiments of the switched-mode power supply according to the invention. The charging circuit 5 and the switching element S as shown in FIGS. 1, 2, 3, and 6 are represented schematically by a dual-position switch 5,S.

In FIG. 7A, a series arrangement of the capacitor C and the inductor L is arranged across the input terminals 1,2 if the dual-position switch 5,S is in a first position. The capacitor C is charged. In the other position of the dual-position switch 5,S, a series arrangement of the capacitor C, the inductor L, the rectifier 6 and the smoothing capacitor C2 form a series resonant circuit. The charge in the capacitor C is transferred to the output terminal 3 via the rectifier 6 to supply current to the smoothing capacitor C2 and the load Z. A cathode of the rectifier 6 is connected to the smoothing capacitor C2. The load Z is arranged between the output terminals 3,4. The input terminal 2 and the output terminal 4 are interconnected.

In FIG. 7B, the capacitor C is arranged across the input terminals 1,2 when the dual-position switch 5,S is in a first position. The capacitor C is charged. An inductor L is arranged in parallel with the series arrangement of the capacitor C and the dual-position switch 5,S if the dual-position switch 5,S is in the second position. The rectifier 6 is arranged between one end of the inductor L, which is connected to the dual-position switch 5,S and the output terminal J. The smoothing capacitor C2 and the load Z are connected across the output terminals 3,4. The anode of the rectifier diode 6 is connected to the smoothing capacitor C2. The input terminal 2 and the output terminal 4 are interconnected. At the moment the dual-position switch 5,S is switched to the second position, the capacitor C and the inductor L form a parallel resonant circuit. First, the energy in the capacitor C is transferred to the inductor L at a high resonance frequency. Next, the majority of the energy in the inductor is transferred to the smoothing capacitor C2 and the load Z via the rectifier 6. In this way, the energy stored in the capacitor C during the first period T1, during which the dual-position switch 5,S is in the first position, is transferred to the load Z during a second period T2, during which the dual-position switch 5,S is in the second position. In a stable situation, wherein the average value of the output voltage Vout is constant, the energy stored in the capacitor C is equal to the energy drawn by the load Z.

In FIG. 7C, in a first position of the dual-position switch 5,S, a series arrangement of the capacitor C and the inductor L is connected between the input terminals 1,2 for charging the capacitor C. In a second position of the dual-position switch 5,S, the capacitor C and the inductor L are arranged in a parallel resonant circuit. The rectifier 6 has a cathode connected to the connection point of the capacitor C and the inductance L, and an anode connected to the output terminal 3. The smoothing capacitor C2 and the load Z are connected across the output terminals 3,4. The input terminal 2 and the output terminal 4 are interconnected. If the dual-position switch 5,S is in the second position, the circuit of FIG. 7C equals the circuit of FIG. 7B and thus functions in the same way.

Figure 8:
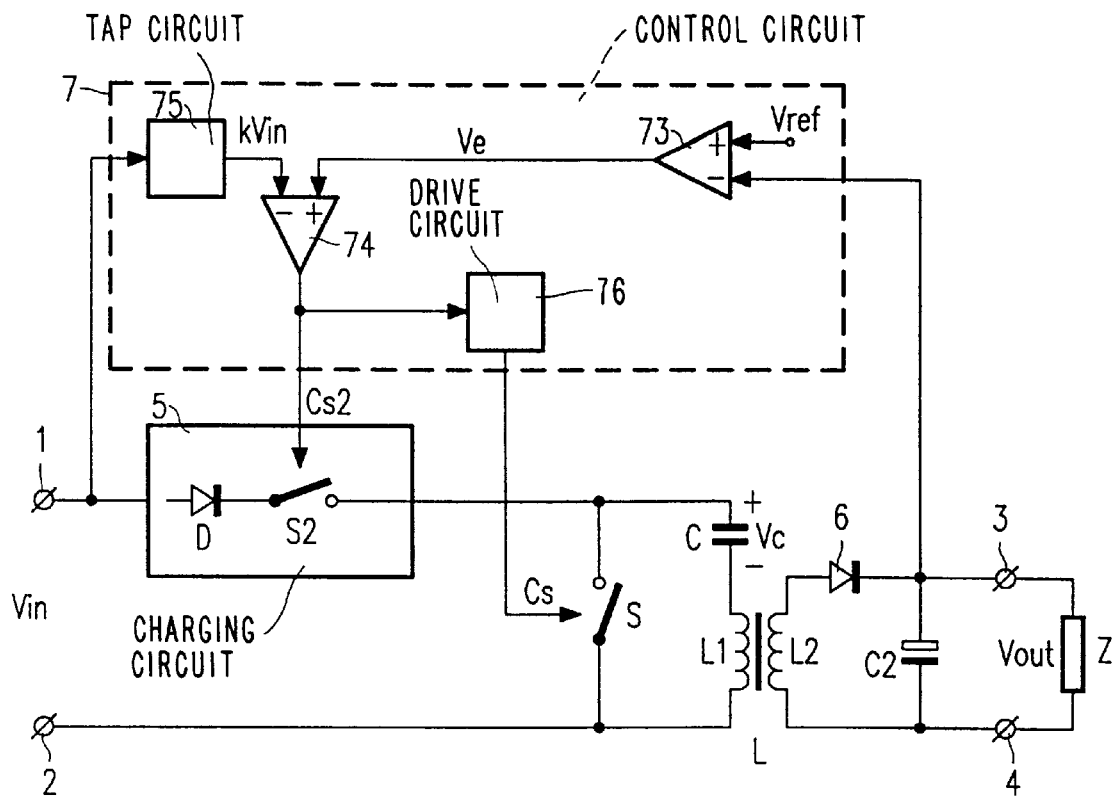
FIG. 8 shows a circuit diagram of an embodiment of a switched-mode power supply according to the invention, in which the charging period of the capacitance is controlled.

FIG. 8 shows a circuit diagram of an embodiment of a switched-mode power supply according to the invention, in which the charging period of the capacitance C is controlled.

The switched-mode power supply circuit comprises input terminals 1,2 to receive an input voltage Vin and output terminals 3,4 to supply a DC output voltage Vout to a load Z. A charging circuit 5 is coupled to the input terminals 1,2 to receive the input voltage Vin. A series arrangement of a capacitor C and a primary winding L1 of an inductor L is connected between an output of the charging circuit 5 and the input terminal 2. The charging circuit 5 comprises a series arrangement of a rectifier circuit D and a controllable switching element S2. A switching element S is connected in parallel with the series arrangement of the capacitor C and the primary winding L1. A parallel arrangement of a smoothing capacitor C2 and the load Z is connected across a secondary winding L2 of the inductor L via a rectifier 6. A control circuit 7 comprises an operational amplifier 73 with an inverting input receiving the output voltage Vout, a non-inverting input receiving a reference voltage Vref, and an output connected to a non-inverting input of a comparator 74. The comparator 74 has an inverting input receiving a tapped input voltage kVin via a tap circuit 75, and an output supplying a control signal Cs2 to a control input of the ontrollable switching element S2. A driver circuit 76 has an input connected to the output of the comparator 74 and an output supplying a control signal Cs to the switching element S. The basic operation of the circuit is the same as described hereinbefore. The capacitor C is charged during a first period T1 during which the series arrangement of the rectifier circuit D and the controllable switching element S2 conducts current to the capacitor C. After this charging period, the switching element S is closed and a resonant circuit is formed with the capacitor C and the inductance L to transfer the charge in the capacitor C to the load. In this embodiment, the inductance L is a transformer. This has the advantage that a mains-separated output voltage Vout is obtained. The control circuit 7 controls the switching of the controllable switching element S2 and the switching element S.

The operation of the control circuit 7 is elucidated in more detail with reference to FIGS. 9A to 9C. It is assumed that the input voltage Vin is an AC line voltage.

FIGS. 9A to 9C show waveforms of signals occurring in the circuit as shown in FIG. 8. FIG. 9A shows the tapped input voltage kVin as a half sinewave, and the error signal Ve at the output of the operational amplifier 73 as a dashed straight line. FIG. 9B shows the control signal Cs2 supplied to the switching element S2, and FIG. 9C shows the voltage Vc on the capacitor C.

It is assumed that the circuit is in a stable situation wherein the output voltage Vout has a desired value. To keep the output voltage Vout at the desired value, the amount of energy stored in the capacitor C has to equal the energy drawn by the load Z during a complete cycle of charging and discharging of the capacitor C. The amount of charge stored in the capacitor depends on the first period T1. The first period T1 is determined by the period of time when both the rectifier circuit D and the controllable switch S2 are conductive. During normal operation, the rectifier circuit D may conduct from instant t1 to instant t4. The first period T1 can be controlled by opening the controllable switch S2 at an instant t3 between instants t1 and t4. The operational amplifier 73 supplies the error signal Ve which is a measure of the difference between the output voltage Vout and the reference voltage Vref. The comparator 74 compares the error signal Ve with the tapped input voltage kVin and supplies the control signal Cs2. The control signal Cs2 is high and the controllable switching element S2 is conductive as long as the error voltage Ve is higher than the tapped input voltage kVin. The control signal Cs2 is low and the controllable switching element S2 is non-conductive during the period from moment t3 to t5 when the error voltage Ve is lower than the tapped input voltage kVin. Both the controllable switching element S2 and the rectifier circuit D are conductive during the period t1 to t3. The first period T1, during which the capacitor C is charged, thus runs from t1 to t3. As shown in FIG. 9C, the voltage Vc on the capacitor C increases during the first period of time T1 and stays at a constant value Vc,n until the switching element S is closed. The constant value Vc,n of the voltage on the capacitor C corresponds to a charge in the capacitor C needed to supply the current drawn by the load Z during the discharge period of the capacitor C.

If the load Z draws less energy than is stored in the capacitor C, the output voltage Vout increases. Consequently, the error voltage Ve decreases and the conductive period t1 to t3 of the controllable switching element S2 decreases. The amount of charge stored in the capacitor C decreases and a stable situation will be reached.

If the amplitude of the AC line input voltage Vin increases (see the dashed half sinewave in FIG. 9A) the conductive period of the controllable switching element S2 decreases from t1–t3 to t1–t2.

Instead of the tapped input voltage kVin, the inverting input of comparator 74 may receive a fixed repetitive waveform (for example, a sinusoidal or sawtooth waveform) which is triggered to the line frequency. A variation of the input voltage Vin will then still be compensated as the output voltage Vout will vary, accordingly.

It is possible to omit the driver circuit 75 and control the switching element S as described with respect to FIG. 6.

It is possible to adapt the circuit shown in FIG. 8 in such a way that the controllable switching element S2 is switched on during the falling edge of the tapped input voltage kVin at the instant t5 (see FIG. 9A) at which the tapped input voltage kVin equals the error voltage Ve. If, in this situation, the controllable switching element S2 is a thyristor, the thyristor will be switched off at instant t6 at which the input voltage Vin crosses the zero level.

Figure 10:
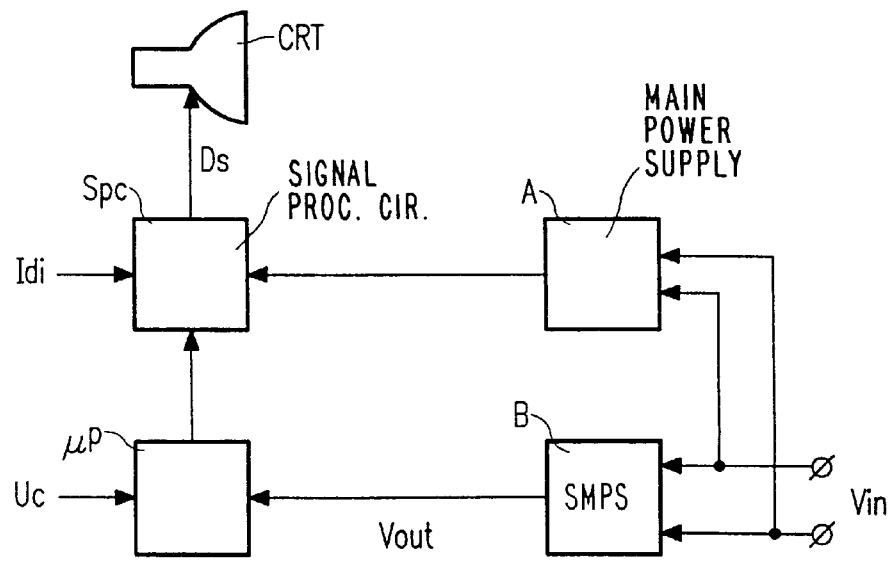
FIG. 10 shows a display apparatus comprising switched-mode a power supply according to the invention.

FIG. 10 shows a display apparatus comprising a switched-mode power supply according to the invention. A signal-processing circuit Spc receives incoming display information Idi which contains position information and video information. The signal-processing circuit Spc may comprise a commonly known synchronizing circuit for determining, in response to the position information, the position on the display device CRT where the corresponding video information has to be displayed. The signal-processing circuit Spc may comprise a commonly known video-processing circuit which processes the video information to obtain drive signals Ds suitable to drive the display device CRT. The display device CRT is, for example, a cathode ray tube, or a matrix display such as a liquid crystal display, or a plasma display. The display apparatus further comprises a command circuit $\mu P$ receiving user commands Uc for adjusting the processing performed by the signal-processing circuit Spc. The command circuit $\mu P$ may comprise an infrared receiver and a microcomputer for receiving and detecting the user commands sent by a remote control. If the user wants to change a setting of the signal-processing circuit Spc, for example, when another broadcast channel has to be selected, the remote control is activated and the command circuit uP instructs the signal-processing circuit Spc to select the desired broadcast channel. A main power supply A supplies power to the signal-processing circuit Spc. A switched-mode power supply B according to the invention supplies its output voltage Vout to the command circuit $\mu P$. Both power supplies A,B receive an input voltage Vin from the line. In the normal operation of the display apparatus, all circuits are powered. In a low power-consuming state of the display apparatus, the main power supply A is inactive and the switched-mode power supply B according to the invention is active. At least part of the command circuit $\mu P$ is powered by the switched-mode power supply according to the invention so as to be able to still receive user commands Uc and switch the display apparatus to the normal mode, if requested.

While the invention has been described in connection with preferred embodiments, it will be understood that modifications thereof within the principles outlined above will be evident to those skilled in the art, and thus the invention is not limited to the preferred embodiments but is intended to encompass such modifications. It is possible to replace the inductor L by a transformer with a primary winding arranged in the position of the inductor L. The transformer has at least one secondary winding to which a load Z is connected via a rectifier element 6. All the switches S,S2 may be suitable semiconductor elements such as, for example, bipolar or field effect transistors, a thyristor or an IGBT. All rectifier elements 5,6,D may comprise suitable semiconductor elements such as, for example, diodes or thyristors.

What is claimed is:

1. A switched-mode power supply circuit comprising:
    input terminals for receiving an input voltage, and output terminals for supplying a DC output voltage to a load;
    a capacitance and an inductance;
    charging means for receiving the input voltage, said charging means being coupled to the capacitance for periodically storing a charge in the capacitance during a first period;
    rectifier means coupled between the inductance and one of the output terminals for supplying the DC output voltage;
    a switching element coupled to the inductance; and
    a control circuit for controlling the switching element in an on or off-state, in which the switching element is periodically in the on-state during a second period, wherein the capacitance, the inductance and the switching element are arranged to form a resonant circuit in the on-state of the switching element for transferring the charge stored in the capacitance to the load via said rectifier means, wherein said first and second periods are disjunct, and wherein transfer of energy from the input terminals to the output terminals is substantially determined by the charge stored in the capacitance, characterized in that the input voltage is an AC line voltage; the charging means comprises a single phase or double phase rectifier circuit for supplying current to the capacitance during the first period; and the control circuit receives the AC line voltage for determining the second period in response to the AC line voltage.

2. The switched-mode power supply circuit as claimed in claim 1, characterized in that the charging means comprises a single phase rectifier circuit for supplying the current to the capacitance during at least part of a first polarity of the AC line voltage; and the control circuit comprises voltage-detecting means for detecting the other polarity of the AC line voltage to generate a control signal which is active during at least part of a period in which the AC line voltage has the other polarity, the active control signal determining the second period.

3. The switched-mode power supply circuit as claimed in claim 2, characterized in that the switching element is a thyristor having a main current path arranged to form the resonant circuit with the inductance and the capacitance when the thyristor is conductive, and a control input coupled to receive the control signal of the voltage-detecting means for bringing the thyristor in a conductive state during the second period.

4. A switched-mode power supply circuit comprising:

input terminals for receiving an input voltage, and output terminals for supplying a DC output voltage to a load;

a capacitance and an inductance;

charging means for receiving the input voltage, said charging means being coupled to the capacitance for periodically storing a charge in the capacitance during a first period;

rectifier means coupled between the inductance and one of the output terminals for supplying the DC output voltage;

a switching element coupled to the inductance; and a control circuit for controlling the switching element in an on or off-state, in which the switching element is periodically in the on-state during a second period, wherein the capacitance, the inductance and the switching element are arranged to form a resonant circuit in the on-state of the switching element for transferring the charge stored in the capacitance to the load via said rectifier means, wherein said first and second periods are disjunct, and wherein transfer of energy from the input terminals to the output terminals is substantially determined by the charge stored in the capacitance, characterized in that a series arrangement of the capacitance and the inductance is coupled to the input terminals (1,2) via the charging means; the rectifier means is coupled between a terminal of the inductance and said one of the output terminals; and the switching element is coupled across the series arrangement of the capacitance and the inductance.

5. A switched-mode power supply circuit comprising:

input terminals for receiving an input voltage, and output terminals for supplying a DC output voltage to a load;

a capacitance and an inductance;

charging means for receiving the input voltage, said charging means being coupled to the capacitance for periodically storing a charge in the capacitance during a first period;

rectifier means coupled between the inductance and one of the output terminals for supplying the DC output voltage;

a switching element coupled to the inductance; and a control circuit for controlling the switching element in an on or off-state, in which the switching element is periodically in the on-state during a second period, wherein the capacitance, the inductance and the switching element are arranged to form a resonant circuit in the on-state of the switching element for transferring the charge stored in the capacitance to the load via said rectifier means, wherein said first and second periods are disjunct, and wherein transfer of energy from the input terminals to the output terminals is substantially determined by the charge stored in the capacitance, characterized in that the charging means comprises a controllable switching element arranged between at least one of the input terminals and the capacitance; and the control circuit supplies a further control signal to the controllable switching element for controlling the controllable switching element in a state enabling charging of the capacitance during the first period, and for disconnecting the capacitance from said at least one input terminal outside the first period.

6. The switched-mode power supply circuit as claimed in claim 5, characterized in that the control circuit comprises comparison means for comparing the input voltage or the output voltage or a voltage across the capacitance with a reference signal to control the first period in order to decrease the influence of a variation of the input voltage or the load.

7. A display apparatus comprising:

a display device for displaying incoming display information;

a signal-processing circuit for processing the incoming display information to form a display signal suitable to drive the display device;

a command circuit for receiving user commands, said command circuit adjusting the processing performed by the signal-processing circuit;

a main power supply for supplying power to at least part of the signal processing circuit; and a switched-mode power supply circuit comprising:

an input for receiving an input voltage and an output for supplying a DC output voltage to a load;

a capacitance and an inductance;

charging means for receiving the input voltage, said charging means being coupled to the capacitance for periodically storing a charge in the capacitance during a first period;

rectifier means coupled between the inductance and the output for supplying the DC output voltage;

a switching element coupled to the inductance; and a control circuit for controlling the switching element in an on or off-state, in which the switching element is periodically in the on-state during a second period, characterized in that the capacitance, the inductance and the switching element are arranged to form a resonant circuit in the on-state of the switching element for transferring the charge stored in the capacitance to the load via said rectifier means, wherein said first and second periods are disjunct, and whereby transfer of energy from the input terminals to the output terminals is substantially determined by the charge stored in the capacitance.

\* \* \* \* \*